United States Patent [19]
Massey

[11] Patent Number: 5,448,054
[45] Date of Patent: Sep. 5, 1995

[54] CIRCUIT FOR USE IN DETERMINING THE POSITION OF LIGHT INCIDENT ON A POSITION SENSING DETECTOR

[75] Inventor: James Massey, Ventura, Calif.

[73] Assignee: The United States of America as represented by the Secretary of the Navy, Washington, D.C.

[21] Appl. No.: 266,392

[22] Filed: Jun. 27, 1994

[51] Int. Cl.⁶ .................. G01C 3/08; H01J 410/14
[52] U.S. Cl. ................. 250/206.1; 250/559.24
[58] Field of Search ............ 250/206.1, 214 A, 561; 356/376, 2, 3.01, 3.02, 3.03, 4.01

[56] References Cited

U.S. PATENT DOCUMENTS

| | | | |
|---|---|---|---|
| 4,494,848 | 1/1985 | Ogawa | 354/403 |
| 4,855,585 | 8/1989 | Nonaka | 250/201 |
| 5,126,815 | 6/1992 | Murakami et al. | 357/30 |
| 5,130,529 | 7/1992 | Muro | 250/214 L |
| 5,187,357 | 2/1993 | Watanabe | 250/206.1 |

OTHER PUBLICATIONS

A Method for Measurement of Multiple Light Spot Positions on One Position-Sensitive Detector (PSD); D. Qian et al; IEEE Transactions on Instrumentation and Measurement, vol. 42, No. 1 Feb. 1993.

Primary Examiner—Edward P. Westin
Assistant Examiner—Stephen Calogero
Attorney, Agent, or Firm—David S. Kalmbaugh; Melvin Sliwka

[57] ABSTRACT

An electronics circuit for use in determining the position light is incident on a position sensing detector. The position sensing detector provides a pair of photoelectric current signals which indicate the position the light is incident on the detector. These photoelectric current signals are converted to negative ramp voltage signals by a dual switched integrator and then provided through a first pair of sample/hold amplifiers to a second pair of sample/hold amplifiers with each of the second pair of sample/hold amplifiers storing for one line of a raster scan the dark current voltage component of one of the photoelectric current signals. Each dark current voltage component, which is a positive voltage, is summed with a negative direct voltage component of the one of the negative ramp voltage signals by a pair of summing/integrating amplifiers which then integrate the summed signals to provide first and second positive ramp voltage signals indicative of the position of the light on the position sensing detector. The first and second ramp voltage signals are next converted to equivalent digital signals by a pair of analog to digital converters.

11 Claims, 3 Drawing Sheets

CIRCUIT FOR USE IN DETERMINING THE POSITION OF LIGHT INCIDENT ON A POSITION SENSING DETECTOR

BACKGROUND OF THE INVENTION

1. Field of the Invention

The present invention relates generally to electronic signal processing circuitry. In particular, the present invention to an electronics circuit for the determining the position of incident light on a position sensing detector.

2. Description of the Prior Art

Position sensing detectors are being utilized to make distance measurements of underwater surfaces for the purpose of three dimensional mapping of the underwater surface. Typically, optical triangulation techniques are used to measure the measure and thus map the underwater surface. A collimated beam of laser light is focused by motorized beam guidance system on the underwater surface or like surface to be measured. The light beam is scattered diffusely from the undersurface surface and then collected by a lens which focuses it to a point on the surface of the position sensing detector. The position the light is incident on the underwater surface is used in conjunction with the position of a mirror of the guidance system to derive the distance to the underwater surface. As the distance from the light source to the underwater surface changes, the position the light is incident on the position sensing detector will be displaced as a function of the change in distance of the light source from the underwater surface.

The position sensing detector in response to the position the light is incident on its surface provides a pair of photocurrent output signals. The photocurrent output signals are converted to first and second voltage signals and amplified by an operational amplifier/feedback circuit. The amplified voltage signals are next processed by a sum and difference circuit which provides sum and difference signals for the amplified voltage signals. The sum and difference signals are supplied to an analog voltage divider which divides the difference signal by the sum signal and provides an analog output signal. The resulting analog output signal indicates the light is incident on the position sensing detector.

The accurate detection of the position of the reflected light beam on the position sensing detector is of concern to an individual mapping an underwater or like surface, since inaccuracies may occur in the mapping of an underwater surface using conventional signal processing techniques such as the technique previously discussed.

In particular, position sensing detectors generally provide a "dark current" or noise whose magnitude is of concern when compared to the magnitude of the light position photocurrents provided by the position sensing detector especially in underwater and like environments where the reflected light beam is very weak due to weak target reflectivity as well as spherical losses which occur during the mapping process. Further, when measurements are made in a deep underwater environment the intensity of the reflected light may vary significantly which necessitates the use of variable gain amplification of the signals provided by the position sensing detector to provide for voltage levels which are acceptable for analog-to-digital converters and other position calculation circuitry.

In view of the foregoing, it is an object of the present to provide an electronics circuit which allows for the accurate calculation of the position of light incident on the surface of a position sensing detector.

It is another object of the present invention to provide an electronics circuit which removes dark current from the photocurrent output signals provided by position sensing circuit thereby allowing for the accurate calculation of the position of light incident on the surface of the position sensing detector.

It is still another object of the present invention to provide an electronics circuit which provides a variable gain amplification factor to allow for an accurate calculation to the position of light incident on the surface of the position sensing detector.

Various other advantages and objects of the present invention will become apparent to those skilled in the art as a more detailed description of the invention is set forth below.

SUMMARY OF THE INVENTION

The objects of the present invention are satisfied by an electronics circuit which is used in determining the position of a laser light which is incident on a position sensing detector. The position laser light is incident on the position sensing detector, in turn, indicates a point of an underwater surface being mapped by an underwater laser mapping system which uses raster scanning to map the underwater surface.

The position sensing detector provides a pair of photoelectric current signals which indicate the position the light is incident on the detector. These photoelectric current signals are converted to negative ramp voltage signals by a dual switched integrator and then provided through a first pair of sample/hold amplifiers to a second pair of sample/hold amplifiers with each of the second pair of sample/hold amplifiers storing for one line of a raster scan the dark current voltage component of one of the photoelectric current signals. Each dark current voltage component, which is a positive voltage, is summed with a negative direct voltage component of the one of the negative ramp voltage signals by a pair of summing/integrating amplifiers which then integrate the summed signals to provide first and second positive ramp voltage signals indicative of the position of the light on the position sensing detector. The first and second ramp voltage signals are next converted to equivalent digital signals by a pair of analog to digital converters. The equivalent digital signals may then be provided to a digital computer which then calculates an X, Y and Z coordinate for each point of the underwater surface being mapped.

BRIEF DESCRIPTION OF THE DRAWINGS

FIG. 3 illustrates timing waveforms occurring at the outputs of some of the electronic components of the circuit of FIG. 2a.

DESCRIPTION OF THE PREFERRED EMBODIMENT

Figure 1:
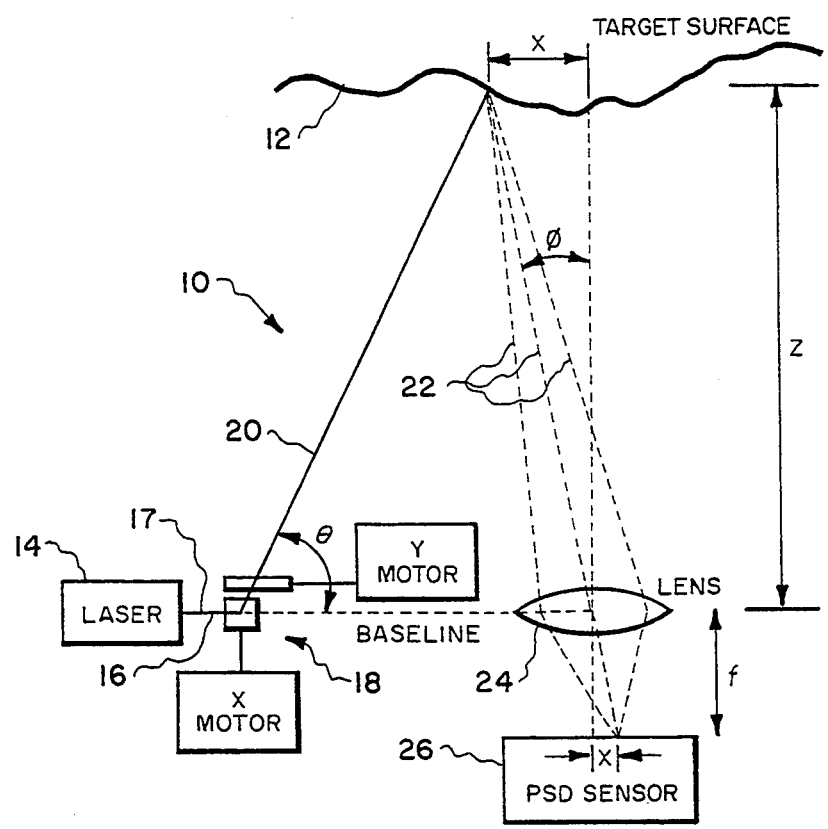
FIG. 1 is a schematic diagram of a system which is used to map the surface in an underwater or like environment.

Referring first to FIG. 1, there shown an underwater laser mapping system 10 which uses the electronics circuit of FIG. 2 to map an underwater surface 12, which may be a deep underwater or like surface. Laser mapping system 10 may also be used to map close range targets (1-2 meters), high resolution targets (1 millimeter) such as ship propellers.

A laser 14 generates a collimated beam of monochromatic light 16 along a first optical path 17 to a motorized beam position guidance system 18 which directs monochromatic light beam 16 along a second optical path 20 to underwater surface 12 over a field of view which constitutes a section of the surface which is being mapped. Motorized beam position guidance system 18 directs beam 16 in a raster scan pattern over the field of view which is about 40 degrees.

The underwater surface 12 reflects the incident beam which is scattered diffusely along third optical paths 22. Monochromatic light beam 16 is reflected along paths 22 to a lens 24 which collects and then focuses the scattered light on a point on a position sensing detector 26 which provides photocurrent signals indicative of the reflective points of beam 16 on underwater surface.

After the photocurrent signals provided detector 26 are processed by the circuit of FIG. 2 a computer may used to calculate the X, Y and Z coordinates of each reflection point of the surface 12 to provide a map of the underwater surface. The following expressions may be used to calculate these coordinate positions.

$$Z = \frac{BL}{\tan\phi + \frac{1}{\tan\theta}} \quad (1)$$

$$X = Z\frac{x}{f} \quad (2)$$

$$Y = Z\tan\rho \quad (3)$$

Where $$\tan\phi = \frac{x}{f} \quad (4)$$

and $\theta$ is the horizontal projection which is illustrated in FIG. 1, $\eta$ is the vertical projection angle, x is the position of the light spot of beam 16 on position sensing detector 26 in millimeters, f is the focal length of lens 24 which is for the lens of FIG. 1 is 24 millimeters, BL is the instrument baseline which is 750 millimeters and $\phi$ is the sensor angle.

In the system illustrated in FIG. 1 a 100 mW green laser was used to scan underwater surface 12 in a raster scan pattern over a field of view of about 40 degrees. Lens 24 may be any commercially available 35 millimeter camera lens which has a focal length of 24 millimeters and an aperture of f/1.4L. The relatively wide angle of lens 24 allows coverage of the field of view without using a complicated synchronous scanning pattern.

Position sensing detector 26 is a lateral silicon photodiode which provides continuous information for a light spot incident on its surface. For the system of FIG. 1, any commercially available position sensor detector, such as the J2L20SP Two-Dimensional Position Sensing Detector manufactured by SiTek Electro Optics of Partille, Sweden may be used as detector 26. It should be understood by those skilled in the art that a one-dimensional position detector may be used with a cylindrical lens in the system of FIG. 1.

Figure 2A:
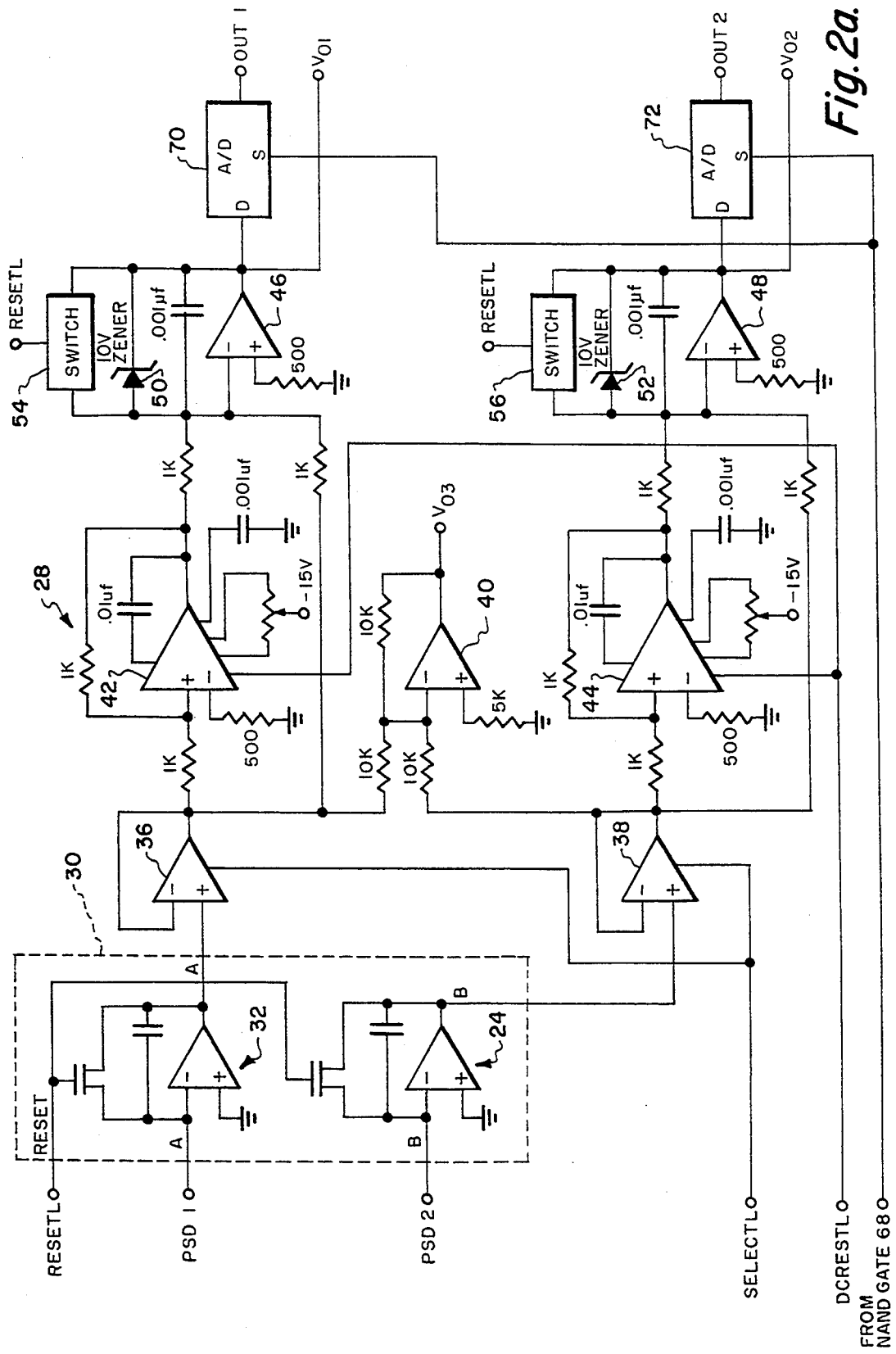
FIGS. 2a and 2b is a circuit diagram of the electronics circuit for determining the position of light incident on a position sensing detector which constitutes the present invention.

Referring to FIGS. 1 and 2a, position sensing detector 26 has a pair of output terminals PSD1 and PSD2. Position sensing detector 26 provides at its PSD1 and PSD2 first and second output currents which are indicative of the one dimensional X position of light beam 16 on the surface of detector 26.

Position Sensing Detectors are fabricated from a slice of silicon with p-doped and n-doped layers which form a PN junction. The P and N layers are formed by ion implantation and act as very homogeneous resistors. Incident light of generates a photoelectric current which flows through the implanted layers and appears at the electrodes of the detector (PSD1 and PSD2 output terminals). Since the resistivity of the layers is extremely uniform, the output photocurrent at each electrode of detector 26 is inversely proportional to the distance between the incident light spot of beam 16 and the electrodes of detector 26 as is best illustrated by the following expression:

$$P = \frac{PSD1 - PSD2}{PSD1 + PSD2} \quad (5)$$

where P is the position of the incident light on detector 26 and PSD1 and PSD2 are the output terminals of detector 26.

When a reverse bias voltage is applied to a position sensing detector in darkness there is a current present at the output terminals PSD1 and PSD2. This current $I_O$ may be as much as 0.7 pA/Hz$^{\frac{1}{2}}$ which may be in a range of about 5%-20% of the total current provided by detector 26, especially when measurements are of a target are made at a distance of between 1-2 meters.

Figure 3:
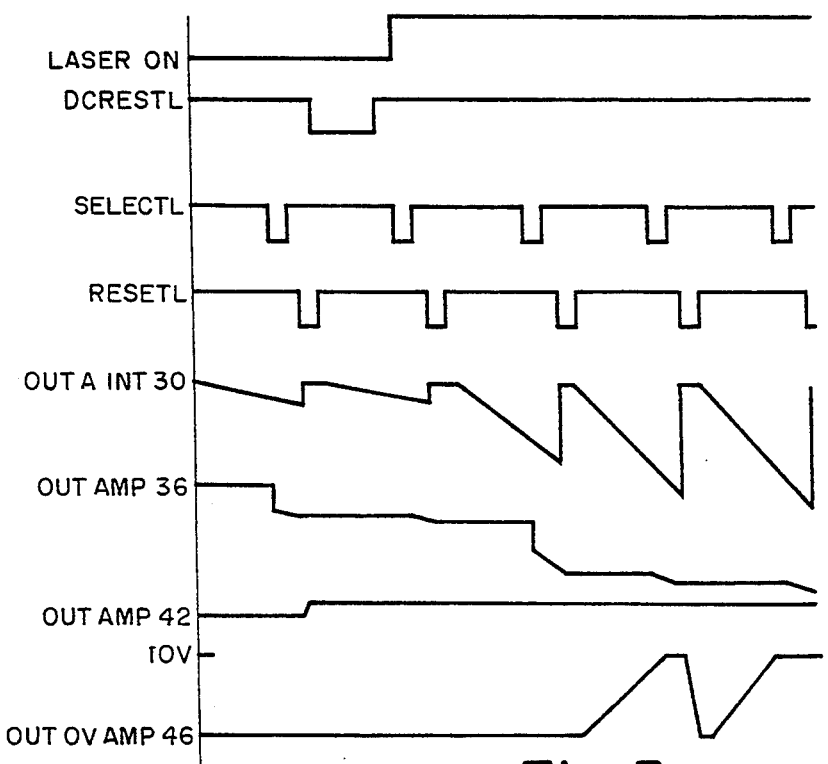

As illustrated by the LASER ON timing waveform of FIG. 3, laser 14 is initially off allowing for a measurement of the dark current/noise for one line of a raster scan of surface 12. First and second photoelectric currents, representative of the dark currents, are provided at the PSD1 and PSD2 outputs of detector 26. The first and second photoelectric currents are supplied respectively to the A and B inputs of a dual switched integrator 30 which is a component of the circuit 28 which is used to process the photoelectric current signals provided by detector 26. Dual switched integrator 30, in turn, comprises a pair of operational amplifiers 32 and 24 configured as integrators. The first and second photoelectric currents are next supplied to the negative inputs of amplifiers/integrators 32 and 24.

Amplifier 32 integrates the first photoelectric current from the PSD1 output of detector 26 providing a ramp voltage as shown in FIG. 3 (OUT A INT 30) which is supplied to the A output of dual switched integrator 30. In a like manner, amplifier 24 integrates the second photoelectric current providing a ramp voltage which has a voltage waveform similar to the waveform of the ramp voltage amplifier 32. The ramp voltage signals provided by amplifiers 32 and 24 are the dark current voltage signals for detector 26.

At this time it should be noted that dual switched integrator 30 is a Model ACF2101 Low Noise Dual Switched Integrator Burr manufactured by Burr-Brown of Tucson, Ariz. It should also be noted the following discussion will be predominately with respect to the ramp voltage signal produced by amplifier 32 since the processing of this signal is identical to the processing of the ramp voltage signal provided by amplifier 24.

The ramp voltage signal of FIG. 3 is next supplied to the positive input of a sample/hold amplifier 36 which has a unity gain. Sample/hold amplifier 36, responsive to the logic zero state of the SELECTL signal of FIG.

3, tracks the A output of dual switched integrator 30. The logic zero to one transition of the SELECTL signal of FIG. 3 next causes sample/hold amplifier 36 to store the voltage signal occurring at the A output of integrator 30 throughout the next integration cycle of amplifier 32 as is best illustrated by the OUT AMP 36 voltage waveform of FIG. 3. In a like manner, sample/hold amplifier 38 tracks the B output of integrator 30 and then stores this output throughout the next integration cycle of amplifier 24.

The first negative going voltage signals held by sample/hold amplifiers 36 and 38 represent the $I_O$ dark current signal generated by position sensing detector 26. These negative going voltage signals are provided to a summing amplifier 40 which sums the signals and then provides a voltage signal at the $V_{O3}$ output of circuit 28 which represents the intensity of the dark current generated by detector 26 when the laser 14 is turned off. In a like manner when laser 14 is turned on the $V_{O3}$ output of circuit 28 represents total signal intensity.

The output of sample/hold amplifier 36 is also connected to the positive input of a sample/hold amplifier 42 which has a gain of minus one. Sample/hold amplifier 42, responsive to the logic zero state of the DCRESTL signal of FIG. 3, tracks the output of amplifier 36 (OUT AMP 36, FIG. 3) storing this signal on the logic zero to one transition of the DCRESTL signal of FIG. 3. Sample/hold amplifier 42 also inverts this signal resulting in the positive going signal of FIG. 3 (OUT AMP 42) which is stored by amplifier 42 for the duration of one line of a raster scan of the system of FIG. 1. In a like sample/hold amplifier 44 tracks the output of amplifier 38, inverting and storing this signal for the duration of a raster scan of the system of FIG. 1.

At this time it should be noted that the sample/hold amplifiers 36, 38, 42 and 44 used in the preferred embodiment of the present invention are Model SHC5320 Bipolar Monolithic Sample/Hold Amplifiers manufactured by Burr-Brown.

After laser 14 is turned on, the magnitude of the ramp voltage signal provided by amplifier/integrator 32 (OUT A, INT 30) increases significantly which may result in a voltage increase of approximately ten times the magnitude of the dark current voltage. For example, the dark current voltage occurring at the output of amplifier 36 may be about ten millivolts, while the voltage occurring at the output of amplifier 36 when laser 14 is on may be more than 100 millivolts.

The signal occurring at the output of amplifier 36 (OUT AMP 36, FIG. 3) is provided to the negative input of an operational amplifier 46 which is configured to first function as a summing amplifier and then function as integrator. Amplifier 46 first sums the negative direct current voltage signal provided by amplifier 36 with the positive dark current voltage signal stored by amplifier 42, thereby subtracting out dark current from the signal to be integrated by amplifier 46. Amplifier 46 then integrates and inverts the summed signal providing at its output the positive going ramp voltage signal of FIG. 3 (OUT AMP 46).

In a like manner, the signal occurring at the output of amplifier 38 is provided to the negative input of an operational amplifier 48 which is configured to first function as integrator. Amplifier 48 first sums the negative direct current voltage signal provided by amplifier 38 with the positive dark current voltage signal stored by amplifier 44, thereby subtracting out dark current from the signal to be integrated by amplifier 48. Amplifier 48 then integrates and inverts the summed signal providing at its output a positive going ramp voltage signal which is similar to the OUT AMP 46 of FIG. 3.

At this time it should be noted that amplifiers 46 and 48 are Model OPA27 Operational Amplifiers commercially available from Burr-Brown.

In it should be noted that amplifier 46 has connected between its negative input and its output a ten volt zener diode 50, while amplifier 48 has connected between its negative input and its output a ten volt zener diode. Ten volt zener diodes 50 and 52 respectively limit the output ramp voltage of amplifiers 46 and 48 to ten volts. The RESETL signal of FIG. 3 closes an electronic switch 54 which resets amplifier 46 such that the output of amplifier 46 transitions to zero volts from the peak magnitude of the positive going ramp voltage of FIG. 3. The RESETL signal of FIG. 3 also closes an electronic switch 56 such that the output of amplifier 48 transitions to zero volts from the peak magnitude of the positive going ramp voltage provided by amplifier 48. Utilizing a ten volt zener diode with amplifiers 46 and 48 prevents the ramp voltage from exceeding ten volts as is best illustrated in FIG. 3, thereby allowing the output voltage of amplifiers 46 and 48 to return to zero volts during the approximately six microsecond time period the RESETL signal is at the logic zero state.

The electronic switches 54 and 56 used in the preferred embodiment of the present invention are Model AD7511D1 CMOS Protected Analog Switches manufactured by Analog Devices.

Figure 2B:
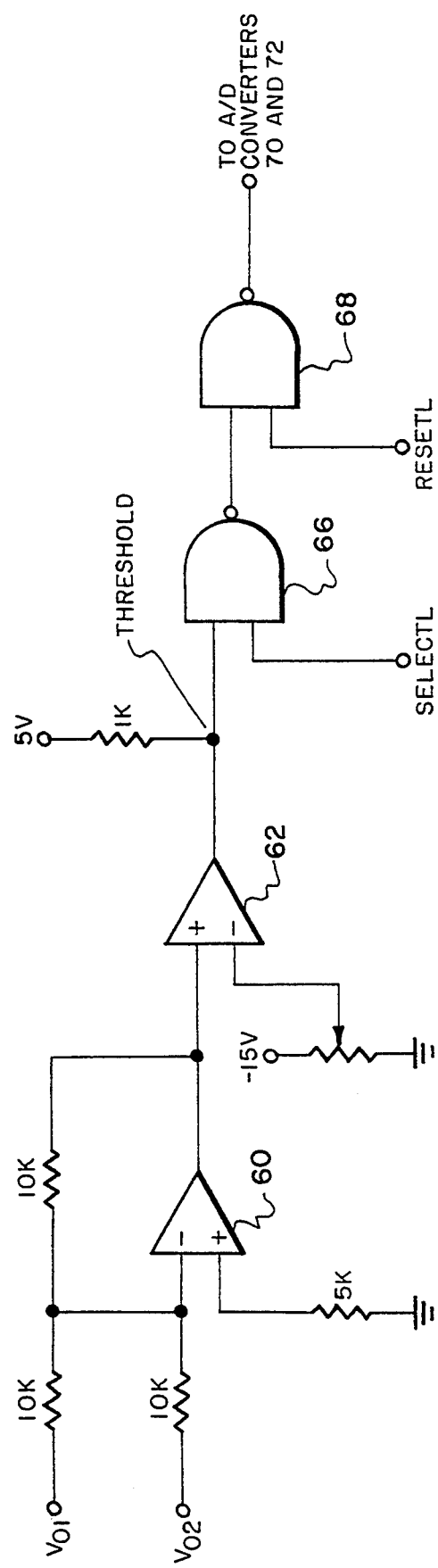

Referring to FIGS. 2a and 2b the positive ramp voltage signals at the outputs of amplifiers 46 and 48 are supplied to the negative input of a summing amplifier 60 which sums the signals and then inverts the summed signal providing at its output a negative ramp voltage signal. This negative ramp voltage is supplied to the positive input of a comparator 62 which has connected to its negative input a variable resistor 64. Variable resistor 64 is set to provide a negative eight volt signal to the negative input of comparator 62 so that the output of comparator 62 transitions from a logic one to a logic zero whenever the ramp voltage signal provided by summing amplifier 60 goes below minus eight volts.

The output of comparator 62 (identified as THRESHL in TABLE I) is connected to the first input of a NAND gate 66 which has its second input receiving the SELECTL signal. The output of NAND gate 66 is connected to the first input of a NAND gate 68 which has its second input receiving the RESETL signal of FIG. 3. The following table illustrates the operation of NAND gates 66 and 68 which provide a logic one to zero transition (ADCL) to trigger analog to digital converters 70 and 72.

TABLE I

| THRESHL | SELECTL | RESETL | ADCL |
|---------|---------|--------|------|
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 1 |
| 1 | 1 | 1 | 1 |

The logic equation for the logic circuit of FIG. 2b is set forth as follows:

$$/ADCL = (/THRESHL = /SELECTL) \cdot RESETL \qquad (6)$$

where ADCL is the output of NAND gate 68. Thus, if either the THRESHL signal or the SELECTL signal transitions to the logic zero state, while the RESETL signal will transition from a logic one to a logic zero triggering analog-to-digital converters 70 and 72.

For example, when the SELECTL and the RESETL input of FIG. 3 are at a logic one state, a logic one to zero transition occurring at the output of comparator 62 will pass through and be inverted by NAND gate 66 and then pass through and be re-inverted by NAND gate 68 before being supplied to the sample inputs of analog to digital converters 70 and 72. This logic one to zero transition when provided by NAND gate 68 to the sample inputs of converters 70 and 72 converts the ramp voltage signals occurring at the data inputs of analog to digital converters 70 and 72 to their equivalent digital signals. These digital equivalent signals (occurring at the OUT1 and OUT2 terminals of circuit 28) may then be processed by a digital computer (not illustrated) to determine the value of x for position equations 2 and 4 which is the position of the light spot of beam 16 on position sensing detector 26. The computer may also be programmed to calculate the X, Y and Z coordinates using equations 1, 2, 3 and 4 for each point of a raster scan of underwater surface 12 thereby allowing one to generate a map of underwater surface 12.

It should be noted that the RESETL signal must be at the logic one state for a logic one to zero transition to occur at the output of NAND gate 68.

It should also be noted that analog to digital converters 70 and 72 will generally be triggered by the logic one to logic zero transitions of the signal provided by NAND gate 68 when the positive going ramp voltage of FIG. 3 is substantially less than ten volts since the signal provided at the output of summing of amplifier 60 is the summed signal of the ramp voltage signals occurring at the outputs of amplifiers 46 and 48.

It should be understood by those skilled in the art that the circuit illustrated in FIGS. 2a and 2b may be used with a position sensing detector in other applications such as distance and vibration measurements.

From the foregoing, it may readily be seen that the present invention comprises a new unique and exceedingly useful circuit for use in determining the position of a light incident on a position detector which constitutes a considerable improvement over the known prior art. Obviously many modifications and variations of the present invention are possible in light of the above teachings. It is therefore to be understood that within the scope of the appended claims the invention may be practiced otherwise than as specifically described.

What is claimed is:

1. An electronics circuit for use in determining an x coordinate position of light incident on a surface of a position sensing detector, said position sensing detector providing a first photoelectric current signal and a second photoelectric current signal representing the x coordinate position said light is incident on said surface of said position sensing detector, said electronics circuit comprising:

integrator means coupled to said position sensing detector for integrating said first photoelectric current signal to provide a first negative going ramp voltage signal and for integrating said second photoelectric current signal to provide a second negative going ramp voltage signal, said first negative going ramp voltage signal having a first dark current voltage component and said second negative going ramp voltage signal having a second dark current voltage component said first and said second dark current voltage components being indicative of noise within said first and said second photoelectric current signals;

first sample/hold amplifier means coupled to said integrator means for tracking said first negative going ramp voltage signal, said first sample/hold amplifier means, responsive to an external select signal, storing said first dark current voltage component and a first direct current voltage component of said first negative going ramp voltage signal;

second sample/hold amplifier means coupled to said integrator means for tracking said second negative going ramp voltage signal, said second sample/hold amplifier means, responsive to said external select signal, storing said second dark current voltage component and a second direct current voltage component of said second negative going ramp voltage signal;

third sample/hold amplifier means coupled to said first sample/hold amplifier means for inverting and storing therein said first dark current voltage component of said first negative going ramp voltage signal;

fourth sample/hold amplifier means coupled to said second sample/hold amplifier means for inverting and storing therein said second dark current voltage component of said second negative going ramp voltage signal;

first summing amplifier means coupled to said first sample/hold amplifier means and said second sample/hold amplifier means for summing said first dark current voltage component stored in said third sample/hold amplifier means with said first direct current voltage component of said first negative going ramp voltage signal to remove said first dark current voltage component from said first direct current voltage component; and second summing amplifier means coupled to said third sample/hold amplifier means and said fourth sample/hold amplifier means for summing said second dark current voltage component stored in said fourth sample/hold amplifier means with said second direct current voltage component of second negative going ramp voltage signal to remove said second dark current voltage component from said second direct current voltage component;

said first direct current voltage having said first dark current voltage component removed therefrom and second direct current voltage component having said second dark current voltages removed therefrom being accurate representations of the x coordinate position said light beam is incident on said surface of said position sensing detector.

2. The electronics circuit of claim 1 wherein said first and said second summing circuit means each comprise a variable gain amplifier.

3. An electronics circuit for use in determining an x coordinate position of light incident on a surface of a position sensing detector, said position sensing detector providing a first photoelectric current signal and a second photoelectric current signal representing the x coordinate position said light is incident on said surface of said position sensing detector, said electronics circuit comprising:

integrator means coupled to said position sensing detector for integrating said first photoelectric current signal to provide a first negative going ramp voltage signal and for integrating said second photoelectric current signal to provide a second negative going ramp voltage signal, said first negative going ramp voltage signal having a first dark current voltage component and said second negative going ramp voltage signal having a second dark current voltage component said first and said second dark current voltage components being indicative of noise within said first and said second photoelectric current signals;

first sample/hold amplifier means coupled to said integrator means for tracking said first negative going ramp voltage signal, said first sample/hold amplifier means, responsive to an external select signal, storing said first dark current voltage component and a first direct current voltage component of said first negative going ramp voltage signal;

second sample/hold amplifier means coupled to said integrator means for tracking said second negative going ramp voltage signal, said second sample/hold amplifier means, responsive to said external select signal, storing said second dark current voltage component and a second direct current voltage component of said second negative going ramp voltage signal;

third sample/hold amplifier means coupled to said first sample/hold amplifier means for inverting and storing therein said first dark current voltage component of said first negative going ramp voltage signal;

fourth sample/hold amplifier means coupled to said second sample/hold amplifier means for inverting and storing therein said second dark current voltage component of said second negative going ramp voltage signal;

first summing amplifier means coupled to said first sample/hold amplifier means and said second sample/hold amplifier means for summing said first dark current voltage component stored in said third sample/hold amplifier means with said first direct current voltage component of said first negative going ramp voltage signal to remove said first dark current voltage component from said first direct current voltage component and then inverting and integrating said first direct current voltage component to provide a first positive going ramp voltage signal; and second summing amplifier means coupled to said third sample/hold amplifier means and said fourth sample/hold amplifier means for summing said second dark current voltage component stored in said fourth sample/hold amplifier means with said second direct current voltage component of second negative going ramp voltage signal to remove said second dark current voltage component from said second direct current voltage component and then inverting and integrating said second direct current voltage component to provide a second positive going ramp voltage signal;

said first and said second positive going ramp voltage signals being an accurate representation of the x coordinate position said light beam is incident on said surface of said position sensing detector.

4. The electronics circuit of claim 3 further comprising:

first analog to digital converter means coupled to said first summing amplifier means for converting said first positive going ramp voltage signal to a first digital data signal; and second analog to digital converter means coupled to said second summing amplifier means for converting said second positive going ramp voltage signal to a second digital data signal.

5. The electronics circuit of claim 3 wherein said integrating means comprises first and second operational amplifiers.

6. An electronics circuit for use in determining an x coordinate position of light incident on a surface of a position sensing detector, said position sensing detector providing a first photoelectric current signal and a second photoelectric current signal representing the x coordinate position of said light on said surface of said position sensing detector, said electronics circuit comprising:

integrator means coupled to said position sensing detector for integrating said first photoelectric current signal to provide a first negative going ramp voltage signal and for integrating said second photoelectric current signal to provide a second negative going ramp voltage signal, said first negative going ramp voltage signal having a first dark current voltage component and said second negative going ramp voltage signal having a second dark current voltage component said first and said second dark current voltage components being indicative of noise within said first and said second photoelectric current signals;

a first sample/hold amplifier coupled to said integrator means for tracking said first negative going ramp voltage signal, said first sample/hold amplifier, responsive to an external select signal, storing said first dark current voltage component and a first direct current voltage component of said first negative going ramp voltage signal;

a second sample/hold amplifier coupled to said integrator means for tracking said second negative going ramp voltage signal, said second sample/hold amplifier, responsive to said external select signal, storing said second dark current voltage component and a second direct current voltage component of said second negative going ramp voltage signal;

a third sample/hold amplifier coupled to said first sample/hold amplifier for inverting and storing therein said first dark current voltage component of said first negative going ramp voltage signal;

a fourth sample/hold amplifier coupled to said second sample/hold amplifier for inverting and storing therein said second dark current voltage component of said second negative going ramp voltage signal;

first summing amplifier means coupled to said first sample/hold amplifier and said third sample/hold amplifier for summing said first dark current voltage component stored in said third sample/hold amplifier with said first direct current voltage component of said first negative going ramp voltage signal to remove said first dark current voltage component from said first direct current voltage component and then inverting and integrating said first direct current voltage component to provide a first positive going ramp voltage signal;

second summing amplifier means coupled to said second sample/hold means and said fourth sample/hold amplifier for summing said second dark current voltage component stored in said fourth sample/hold amplifier with said second direct current voltage component of said second negative going ramp voltage signal to remove said second dark current voltage component from said second direct current voltage component and then inverting and integrating said second direct current voltage component to provide a second positive going ramp voltage signal;

a first analog to digital converter coupled to said first summing amplifier means for converting said first positive going ramp voltage signal to a first digital data signal;

a second analog to digital converter coupled to said second summing amplifier means for converting said second positive going ramp voltage signal to a second digital data signal;

said first and said second digital data signals being an accurate representation of the x coordinate position said light is incident on said surface of said position sensing detector; and signal generating means coupled to said first summing amplifier means, said second summing amplifier means, said first analog to digital converter and said second analog to digital converter, said signal generating means responsive to said first positive going ramp voltage signal and said second positive going ramp voltage signal generating a sample signal;

said sample signal causing said first analog to digital converter to convert said first positive going ramp voltage signal to said first digital data signal and said sample signal causing said second analog to digital converter to convert said second positive going ramp voltage signal to said second digital data signal.

7. The electronics circuit of claim 6 wherein said integrating means comprises first and second operational amplifiers.

8. The electronics circuit of claim 6 wherein said sample signal generating means comprises:
a summing amplifier having a first input for receiving said first positive going ramp voltage signal, a second input for receiving said second positive going ramp voltage signal and an output;
a voltage comparator having a first input connected to the output of said summing amplifier, a second input and an output;
a voltage source for providing approximately eight volts to the second input of said voltage comparator;
a first NAND gate having a first input connected to the output of said voltage comparator, a second input for receiving said external select signal and an output; and
a second NAND gate having a first input connected to the output of said first NAND gate, a second input for receiving an external reset signal and an output for providing said sample signal to said first analog to digital converter and said second analog to digital converter.

9. The electronics circuit of claim 6 further comprising a summing amplifier having a first input connected to said first sample/hold amplifier and a second input connected to said second sample/hold amplifier.

10. An electronics circuit for use in determining an x coordinate position of a beam of light incident on a surface of a position sensing detector, said position sensing detector providing a first photoelectric current signal and a second photoelectric current signal representing the x coordinate position said light is incident on said surface of said position sensing detector, said electronics circuit comprising:

a first integrating amplifier coupled to said position sensing detector for integrating said first photoelectric current signal to provide a first negative going ramp voltage signal;

a second integrating amplifier coupled to said position sensing detector for integrating said second photoelectric current signal to provide a second negative going ramp voltage signal;

said first negative going ramp signal having a first dark current voltage component and said second negative going ramp voltage signal having a second dark current voltage component, said first and said second dark current voltage components being indicative of noise within said first and said second photoelectric current signals;

a first sample/hold amplifier coupled to said first integrating amplifier for tracking said first negative going ramp voltage signal, said first sample/hold amplifier, responsive to an external select signal, storing said first dark current voltage component and a first direct current voltage component of said first negative going ramp voltage signal;

a second sample/hold amplifier coupled to said second integrating amplifier for tracking said second negative going ramp voltage signal, said second sample/hold amplifier, responsive to said external select signal, storing said second dark current voltage component and a second direct current voltage component of said second negative going ramp voltage signal;

a third sample/hold amplifier coupled to said first sample/hold amplifier for inverting and storing therein said first dark current voltage component of said first negative going ramp voltage signal;

a fourth sample/hold amplifier coupled to said second sample/hold amplifier for inverting and storing therein said second dark current voltage component of said second negative going ramp voltage signal;

a first summing amplifier coupled to said first sample/hold amplifier and said third sample/hold amplifier for summing said first dark current voltage component stored in said third sample/hold amplifier with said first direct current voltage component of said first negative going ramp voltage signal to remove said first dark current voltage component from said first direct current voltage component and then inverting and integrating said first direct current voltage component to provide a first positive going ramp voltage signal;

a second summing amplifier coupled to said second sample/hold amplifier and said fourth sample/hold amplifier for summing said second dark current voltage component stored in said fourth sample/hold amplifier with said second direct current voltage component of said second negative going ramp voltage signal to remove said second dark current voltage component from said second direct current voltage component and then inverting and integrating said second direct current voltage component to provide a second positive going ramp voltage signal;

a first analog to digital converter coupled to said first summing amplifier for converting said first positive going ramp voltage signal to a first digital data signal;

a second analog to digital converter coupled to said second summing amplifier for converting said second positive going ramp voltage signal to a second digital data signal;

said first and said second digital data signals being an accurate representation of the x coordinate position of said light beam on the surface of said position sensing detector; and a sample signal generating circuit coupled to said first summing amplifier, said second summing amplifier means, said first analog to digital converter and said second analog to digital converter, said sample signal generating circuit responsive to said first positive going ramp voltage signal and said second positive going ramp voltage signal generating a sample signal;

said sample signal causing said first analog to digital converter to convert said first positive going ramp voltage signal to said first digital data signal and said sample signal causing said second analog to digital converter to convert said second positive going ramp voltage signal to said second digital data signal;

said sample signal generating circuit comprising:

a third summing amplifier having a first input for receiving said first positive going ramp voltage signal, a second input for receiving said second positive going ramp voltage signal and an output;

a voltage comparator having a first input connected to the output of said third summing amplifier, a second input and an output;

a voltage source for providing approximately eight volts to the second input of said voltage comparator;

a first NAND gate having a first input connected to the output of said voltage comparator, a second input for receiving said external select signal and an output; and a second NAND gate having a first input connected to the output of said first NAND gate, a second input for receiving an external reset signal and an output for providing said sample signal to said first analog to digital converter and said second analog to digital converter.

11. The electronics circuit of claim 10 further comprising a fourth summing amplifier having a first input connected to said first sample/hold amplifier and a second input connected to said second sample/hold amplifier.

* * * * *